Sept. 8, 1936.   G. F. TAYLOR   2,053,977
LAMINATED CEMENTED CARBIDE TOOL BIT
Filed July 24, 1935
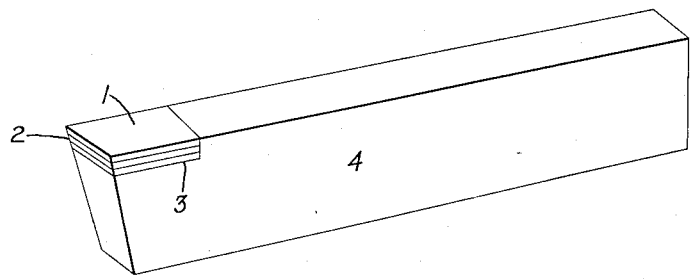
Inventor:
George F. Taylor,
by  Harry E. Dunham
His Attorney.

Patented Sept. 8, 1936

2,053,977

UNITED STATES PATENT OFFICE 2,053,977

LAMINATED CEMENTED CARBIDE TOOL BIT

George F. Taylor, Schenectady, N. Y., assignor to General Electric Company, a corporation of New York Application July 24, 1935, Serial No. 32,853

2 Claims. (Cl. 29—95)

The present invention relates to metal cutting tool bits and more particularly to cemented tantalum carbide tool bits and the like.

While cemented tantalum carbide has very desirable characteristics as a steel cutting material, it is not very strong nor can it be copper brazed readily to a supporting steel shank. When cemented tantalum carbide is copper-brazed to steel in the manner usually employed in mounting cemented tungsten carbide tool bits, it is found that the cemented tantalum carbide tool bit chips or breaks quite easily usually because of the tendency of the steel shank to mushroom.

I have found however that if a cemented tantalum carbide tool bit is not secured direct to the steel shank but instead is employed as the top layer of a laminated tool bit consisting of a foundation layer of cemented tungsten carbide and one or more intermediate layers consisting of tungsten carbide, tantalum carbide and a binder metal therefor that the danger of breakage of the tool bit is substantially eliminated. By employing a laminated tool bit of the above composition the change in physical characteristics from the lower layer to the upper layer is a gradual one. Furthermore, the quantity of expensive tantalum carbide employed in the tool bit is reduced to a minimum and at the same time it is possible to obtain a tool bit which does not chip or break but is hard and tough and may be copper brazed readily to a steel shank.

The novel features which are characteristic of my invention are set forth with particularity in the appended claims. The invention itself however will best be understood from reference to the following specification when considered in connection with the accompanying drawing in which the single figure is a perspective view of a metal cutting lathe tool embodying the features of my invention.

In carrying out my invention, I form a tool tip having a thin cutting layer or lamination 1 which may consist entirely of a relatively brittle cemented carbide, for example a sintered composition consisting of tantalum carbide and a cementing metal such as cobalt, the cobalt usually comprising about 3 to 20% of the composition. The cutting layer 1 is supported on an intermediate cemented carbide layer 2 consisting substantially of tungsten carbide and tantalum carbide in any desired proportions with about 3 to 20% of a binder metal such as cobalt. The intermediate layer is supported on a sintered foundation layer 3 consisting substantially of tungsten carbide and cobalt the cobalt content preferably varying from about 3 to 20%. The entire laminated tip is supported on a suitable steel shank 4.

My improved tool tip may be fabricated either by the well known cold press or hot press methods. If the cold press method is employed, I place the foundation layer consisting of powdered tungsten carbide and cobalt in the bottom of a steel mold. An intermediate layer consisting of powdered tungsten carbide, tantalum carbide and cobalt is then placed on the foundation layer 1 and a top layer consisting of a powdered mixture of tantalum carbide and cobalt is placed above the intermediate layer. Pressure is then applied to the powdered material in the mold after which the pressed material is sintered in a closed boat in a hydrogen furnace. The tip or bit thus fabricated may then be copper brazed to a steel supporting shank. The brazing operation involves no difficulty since cemented tungsten carbide may be brazed easily to steel.

Instead of forming the tool tip by the cold press method, I may place the successive layers of powdered material in a carbon mold and then press and simultaneously sinter the powdered material into a hard compact mass which thereafter may be secured to a suitable supporting shank.

When several intermediate layers each consisting of tungsten carbide, tantalum carbide and a lower melting binder material such as cobalt are employed, the layers or laminations nearest the foundation layer of cemented tungsten carbide preferably consist predominantly of tungsten carbide while in those layers nearest the cemented tantalum carbide outer layer the intermediate layers preferably consist predominantly of tantalum carbide.

My improved tool tip is relatively inexpensive since the quantity of tantalum carbide employed is reduced to a minimum. Tantalum carbide is the most expensive ingredient employed in the tool tip but its reduction in quantity to a relatively thin layer does not affect the cutting quality of the tool. Moreover, the use of intermediate layers of cemented carbide provide an unusually tough and unusually hard supporting body for the cemented tantalum carbide layer 1.

While I have illustrated by invention in connection with cemented tantalum carbide, it is clear that I may if desired substitute in whole or in part therefor other cemented carbides of metals of the fifth group of the periodic system of elements, also that instead of cemented tungsten carbide, I may substitute molybdenum carbide in whole or in part therefor. Instead of a binder metal such as cobalt, I may employ any of the simple or complex binder materials commonly employed in the fabrication of cemented carbide tools.

What I claim as new and desire to secure by Letters Patent of the United States, is:

1. A sintered laminated tool tip having an outer layer consisting of a carbide of metal of the fifth group and a binder medium therefor, a foundation layer consisting substantially of a carbide of a metal of the sixth group and a binder medium therefor, and an intermediate layer consisting of a carbide of metal of the fifth and sixth groups of the periodic table and a binder medium therefor.

2. A sintered laminated tool tip having an outer layer consisting substantially of tantalum carbide and cobalt, a foundation layer consisting substantially of tungsten carbide and cobalt and an intermediate layer consisting substantially of tungsten carbide, tantalum carbide and cobalt.

GEORGE F. TAYLOR.